Nov. 16, 1954 V. EY 2,694,410
FLUID PRESSURE REGULATOR
Filed Oct. 20, 1950 2 Sheets-Sheet 2
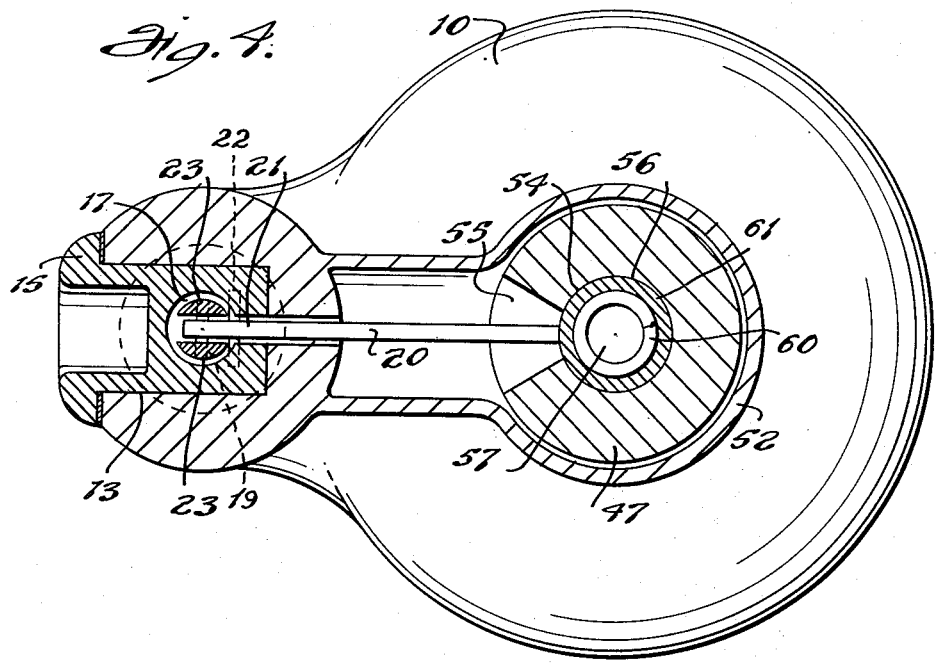
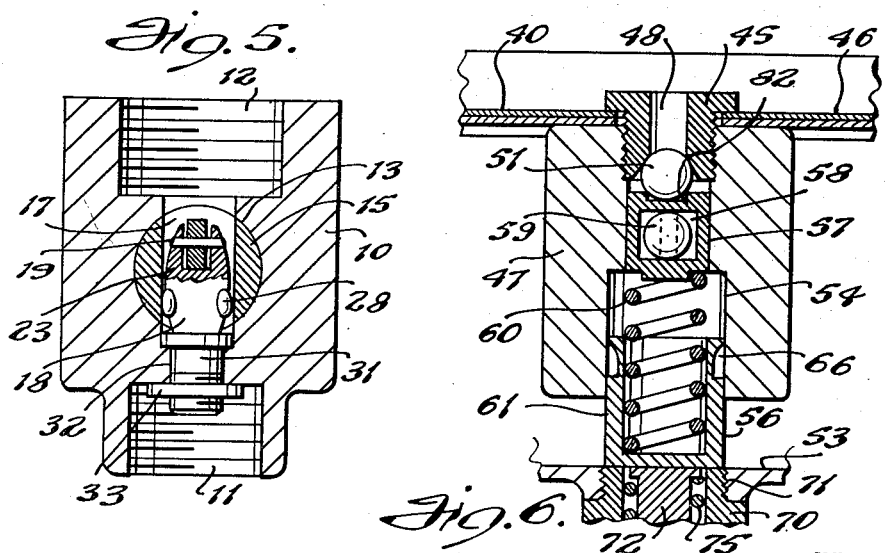
INVENTOR.
VICTOR EY
BY

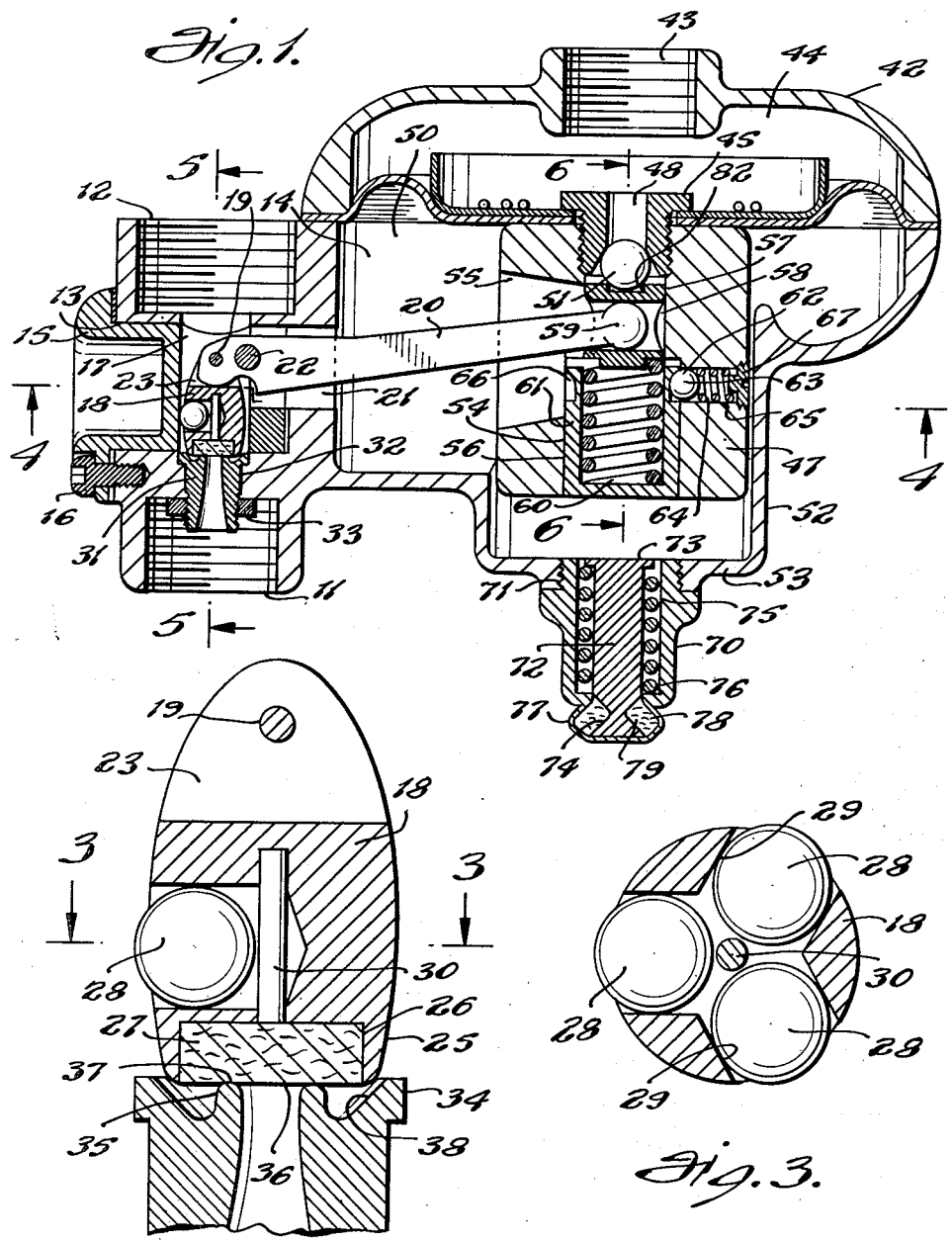

United States Patent Office 2,694,410
Patented Nov. 16, 1954

2,694,410

FLUID PRESSURE REGULATOR

Victor Ey, Woodside, N. Y.

Application October 20, 1950, Serial No. 191,180

2 Claims. (Cl. 137—505.46)

This invention relates to fluid pressure regulators and has particular reference to an improved regulator of said character which is constructed and arranged to permit of the convenient removal and replacement of the valve element and associated parts.

Regulators of this type are installed in homes, buildings and the like for reducing the pressure of gas admitted from the high pressure line and for supplying the same under reduced pressure through the service line for heating, cooking, lighting and the like. Such regulators embody a valve closure element which is actuated for opening and closing the valve thereof in accordance with the supply of gas required by movement of a flexible diaphragm having a weight affixed thereto for effecting movement thereof in one direction and which has the pressure of the gas within the regulator exerted thereagainst for movement of the diaphragm in the opposite direction.

Another object of the invention is the provision of a regulator of said character having a passageway for the flow of gas through the regulator and with a valve element mounted in said passageway for reciprocatory movement on rollable elements to afford freedom of movement of the valve element and render the same sensitive to slight change of pressure within the regulator.

Still another object of the invention is to provide a regulator of said character having a valve element mounted in a passageway extending inwardly in axial alignment with the inlet orifice for guided reciprocatory movement thereof toward and away from closed relation with said orifice and for universal rocking movement about an axis extending longitudinally through the center thereof for centering the valve element with reference to said orifice by means of rollable bearings mounted in circumferentially spaced relation about the periphery of said valve element substantially medially of the ends thereof and engaging the periphery of said passageway.

Still another object of the invention is to provide a fluid pressure regulator with a replaceable section providing a passageway for the flow of fluid between the inlet and outlet openings and which section is formed as a unit with the valve element and rollable bearings arranged between the valve element and the periphery of the passageway to permit of the convenient removal and repair or replacement of the valve element and associated parts.

With the foregoing and other objects in view, reference is now made to the following specification and accompanying drawings in which the preferred embodiment of the invention is illustrated.

In the drawings:

Fig. 1 is a vertical sectional view through a fluid pressure regulator constructed in accordance with the invention and illustrating the same in closed relation.

Fig. 2 is an enlarged fragmentary sectional view through the valve element and valve port.

Fig. 3 is a horizontal sectional view taken approximately on line 3—3 of Fig. 2.

Fig. 4 is a horizontal sectional view taken approximately on line 4—4 of Fig. 1.

Fig. 5 is a vertical sectional view taken approximately on line 5—5 of Fig. 1.

Fig. 6 is a vertical sectional view taken approximately on line 6—6 of Fig. 1 and illustrating the expansion device in released relation and the valve through the diaphragm in open relation to vent the regulator.

Referring to the drawings by characters of reference, the regulator illustrated is shown in its application for use in supplying gas to homes, buildings and the like. The regulator is adapted to be connected with the high pressure supply line leading into the building from the main in the street containing gas at approximately 10 to 50 lbs. pressure which is reduced by the regulator for use at approximately 1/5 lb. pressure.

The regulator includes a casing 10 having threaded inlet and outlet openings 11 and 12 arranged in axial alignment at one side thereof and adapted to be respectively connected with a high pressure supply line and a low pressure service line. Intermediate the inlet and outlet openings 11 and 12 the casing is formed with a cylindrical cavity 13 which opens through one side of the casing and communicates at its inner end with the hollow interior 14 of the casing. Snugly fitted into said cavity is a cylindrical member 15 having a headed outer end secured against the side of the casing by screws 16. The cylindrical member 15 is formed with a bore 17 arranged in axial alignment with the inlet and outlet openings 11 and 12 and forming a passageway therebetween in which is arranged a valve closure element 18 pivotally mounted on a pivot pin 19 on the end of a lever 20 projecting into said passageway through a slot 21. The slot 21 extends vertically through the inner end of said cylindrical member and opens into said passageway longitudinally thereof with the inner end of said lever protruding therethrough and projecting into the hollow interior 14 of the casing. The lever 20 is rockable in said slot on a cross pin 22 for imparting reciprocatory movement to the valve closure element 18 toward and away from a valve seat in response to change of pressure in the hollow interior 14 as will be more fully explained hereinafter.

The valve closure element 18 is bifurcated at its upper end through which furcations 23 the pivot pin 19 extends for pivotally connecting said element to the outer end 24 of the lever 20. The lower end of the closure element is of general oval formation in vertical section and of circular formation in horizontal section so as to provide an arcuate or spherical peripheral wall portion 25 at the lower end thereof. The said element is formed with an annular recess 26 in the lower end wall thereof in which is fitted a fibrous disk 27 fashioned from leather or other equivalent material. The said closure element is mounted for guided reciprocatory movement in the passageway 17 on balls 28 disposed for free turning movement in cylindrical sockets 29 arranged in said closure element about the axis thereof. The balls are three in number and are disposed with adjacent balls spaced apart an angle of 120° in a plane extending horizontally through the closure element with the balls engaging against a center pin 30 arranged vertically at the intersection of the cylindrical sockets. The balls protrude through the outer ends of said sockets for snug rolling engagement against the peripheral wall of the passageway thereby centering the lower end of the closure element with reference to the valve seat when in closed relation so as to prevent escape of gas and permit slight variation of pressure in the casing to effect movement thereof and to avoid sticking or freezing of the valve element.

The valve seat is formed on the inner end of a bushing 31 fitted in the reduced inner end 32 of the inlet opening 11 and has its protruding lower end threadedly engaged by a nut 33 for securing the bushing in position. The bushing is formed with an enlarged or flanged inner end 34 which is fitted in a recess in the inner end of the reduced portion of the inlet opening 11. The flanged inner end 34 is provided with an annular recess defining an upstanding peripheral wall 35 surrounding the central opening or valve port 36 in the bushing 31 which peripheral wall is formed with a rounded upper end forming a valve seat 37 adapted to be engaged by the disk 27 for closing the inlet opening 11. Concentric with and surrounding the valve seat 37 in spaced relation thereto is an inverted frusto-conical wall 38 providing a secondary or emergency valve seat which is adapted to be engaged by the spherical wall portion 25 for positively shutting off the flow of gas through the inlet opening in the event that the fibrous disk 27 is fractured for any reason such as by excess pressure within the casing. The spherical wall portion 25 of the closure element 18 engages against the frusto-conical wall portion 38 annularly in tangent relation therewith whereby the closure element will seat on said secondary or emergency valve seat to close the valve port irrespective of whether or not the closure element engages the seat in exact axial relation.

The lever arm 20 has rocking movement on the cross pin 22 by the pressure differential on opposite sides of a diaphragm 40 which is arranged with its marginal edge portion secured on the annular rim 41 by a removable cover 42. The cover 42 has a threaded vent opening 43 which is adapted to receive a vent pipe (not shown) extending through the roof or to the outside of the building for venting the chamber 44 above the diaphragm to the atmosphere. The diaphragm is provided with an apertured stud 45 which extends downwardly through a centrally apertured cup 46 with the threaded lower end thereof anchored in the upper end of a cylindrical member 47 so as to secure the cup against the upper face of the diaphragm and the cylindrical member in depending relation against the lower face thereof. The opening 48 in the stud 45 provides a passageway through the diaphragm between the lower chamber 50 and the upper chamber 44. The said passageway is normally closed by a ball valve 51 but which is adapted to be opened in case of emergency so as to establish communication between said upper and lower chambers for permitting of the flow of gas in the lower chamber to pass through the upper chamber and be vented to the atmosphere.

The diaphragm 40 is weighted by the cylindrical member 47 to thereby maintain downward pressure on the diaphragm in opposition to upward pressure of the gas within the lower chamber 50. The cylindrical member 47 is guided in its movement by the cylindrical wall portion 52 of the casing within which the lower portion of the cylindrical member has free sliding movement with the lower end thereof normally spaced from the bottom wall 53. The cylindrical member 47 is formed with a vertical bore 54 opening through the opposite ends thereof and communicating with said bore substantially centrally thereof is a vertical slot 55 which opens through one side thereof. The bore 54 is threaded at its upper end in which is secured the stud 45. Arranged in the lower portion of said bore is an expansion device 56 and between said expansion device and the ball valve 51 is an intermediate element 57 having a horizontal bore 58 opening through the opposite side faces thereof in which the ball shaped end 59 of the lever 20 is fitted. The expansion device 56 consists of a coiled expansion spring 60 arranged in tensioned relation in a hollow cylindrical member 61 with the lower end of said spring engaging against the bottom wall thereof and with the upper end of said spring engaging against the lower wall of said intermediate element 57. The expansion spring 60 functions to maintain the intermediate element 57 in tensioned engagement against the ball valve 51 so as to normally close the passageway 48 between the upper end lower chambers 44 and 50. The spring 60 also functions to hold the inner end of the lever 20 in position so as to rock on the cross pin 22 in accordance with the movement of the weight or cylindrical member 47.

The expansion device 56 is normally retained in the bore 54 by a spring detent 62. The detent consists of a spherical element 63 and a coiled expansion spring 64 arranged in a lateral opening 65 in the cylindrical member or weight 47 with the spherical element disposed in protruding relation and tensioned against the recessed face 66 of the cylindrical member 61. A screw plug 67 closes the outer end of the opening 65 and retains the spring against the spherical element 63.

It is to be understood that when the valve closure element 18 is engaged on the valve seat 37 so as to close the valve port 36, the inner end 59 of the lever 20 is held against upward movement. In the event that the valve is closed and the pressure in the lower chamber 50 continues to increase for any reason so as to force the diaphragm 40 upwardly, the cylindrical member or weight 47 will move upwardly therewith. The lever 20 will prevent upward movement of the expansion device 56 whereby the expansion device will be forced out of engagement with the detent 62. The spring 60 will then be released to force the cylindrical member 61 downwardly against the bottom wall 53 of the casing. This will release the pressure of the spring against the ball valve 51 to thereby open the passageway 48 as illustrated in Fig. 6 of the drawings for the discharge of gas from the lower chamber 50 to the atmosphere.

The regulator also includes automatic means for shutting off the flow of gaseous fluid through the valve port 36 in the event of fire in the home or building in which the regulator is installed. The said means consists of a housing 70 secured at its upper end in a threaded opening 71 in the bottom wall 53 of the casing 10 so that the housing depends therefrom in axial vertical alignment with the weight or cylindrical member 47. Arranged within the casing is a plunger 72 having an annular flange 73 at its upper end and an annular recess 74 adjacent its lower end of V-shaped formation in vertical section. A coiled expansion spring 75 is arranged about the plunger 72 between the flange 73 and the inwardly directed wall portion 76 of the housing 70. The recessed portion 74 of the plunger is located in the thin walled lower extremity 77 of the housing which is formed to provide a V-shaped recess 78 extending annularly about the recess 74 and protruding outwardly beyond the wall portion 76. The annular space defined by the recesses 74 and 78 within the extremity 77 of the housing is filled with a fuse metal 79 or a metal of low melting point which retains the plunger 72 in position in the housing and the spring 75 in tensioned relation. The housing 70 is preferably fashioned of aluminum or other equivalent material while the lower extremity 77 is of reduced thickness in order that the fuse metal 79 will be quickly heated and melted in case of fire. The fuse metal will then give away whereupon the spring 75 will jam the plunger 72 upwardly against the weight or cylindrical member 47 which will force the same upwardly and swing the inner end 59 of the lever 20 upwardly to thereby force the closure member 18 downwardly against its seat 37.

This action of the spring 75 may possibly fracture the fibrous disk 27 so that the same will fail to close the valve port 36. In such event, the closure member 18 will be forced downwardly so that the spherical lower end 25 thereof will be impinged against the conical emergency seat 38 in order to insure complete closure of the valve port 36.

The cup 46 is adapted to receive small particles 81 such as shot and the like to augment the weight of the cylindrical member 47, it being understood that the weight on the diaphragm 40 determines the pressure of the fluid at the outlet 12.

The intermediate element 57 is formed with a circular recess 82 in the upper face thereof for centralizing the ball valve 51 with reference to the seat 83 at the lower end of the pasageway 48 and for retaining the same thereon.

What is claimed is:

1. In a fluid pressure regulator, a casing having inlet and outlet openings and an opening extending into said casing between said inlet and outlet openings, a replaceable casing section fitted in said opening to close the same, said casing section having a passageway disposed in alignment with the inlet opening for the flow of fluid therethrough, a valve element arranged in said passageway, a lever pivoted to said casing section and to said valve element, and rollable bearings mounted in circumferentially spaced relation about the periphery of said valve element substantially medially of the ends thereof and engaging the periphery of said passageway for guided reciprocatory movement of the valve element toward and away from closed relation with said opening.

2. In a fluid pressure regulator of the diaphragm type, a casing having inlet and outlet openings, a replaceable unit consisting of a tubular member, a valve element and a lever, said tubular member having a passageway therethrough in which the valve element is arranged, said lever being pivoted to said tubular member and to said valve element for movement of the valve element in said passageway toward and away from closed relation with said inlet opening, means carried by said diaphragm providing a socket for slidably receiving the inner end of the lever for effecting movement of the lever with the movement of the diaphragm, and means releasably securing said tubular member in position in the casing to dispose the passageway therein in communication with the inlet opening and permitting of the removal of said tubular member and valve and lever as a unit.

(References on following page)

References Cited in the file of this patent

UNITED STATES PATENTS

| Number | Name | Date |
|---|---|---|
| 227,234 | Foster | May 4, 1880 |
| 854,340 | Dixon | May 21, 1907 |
| 942,546 | Collin | Dec. 7, 1909 |
| 1,166,210 | Holley | Dec. 28, 1915 |
| 1,508,291 | Penfield | Sept. 9, 1924 |
| 1,540,439 | Thrall | June 2, 1925 |
| 1,988,966 | Eckhouse | Jan. 22, 1935 |
| 2,582,974 | Ey | Jan. 22, 1952 |

FOREIGN PATENTS

| Number | Country | Date |
|---|---|---|
| 169 | Great Britain | Oct. 4, 1893 |